US006650273B1

(12) United States Patent
Obenshain

(10) Patent No.: US 6,650,273 B1
(45) Date of Patent: Nov. 18, 2003

(54) CHANGE SUBTRACTION OF SYNTHETIC APERTURE RADAR DATA

(75) Inventor: Kenneth Fell Obenshain, Manassas, VA (US)

(73) Assignee: Lockheed Martin Corporation, Goodyear, AZ (US)

( * ) Notice: Subject to any disclaimer, the term of this patent is extended or adjusted under 35 U.S.C. 154(b) by 0 days.

(21) Appl. No.: 10/139,953

(22) Filed: May 6, 2002

(51) Int. Cl.[7] .............................................. G01S 13/90
(52) U.S. Cl. ...................... 342/25; 382/103; 342/160; 342/162
(58) Field of Search ........................... 342/25, 160–162; 382/103, 106, 107, 294

(56) References Cited

U.S. PATENT DOCUMENTS

| | | | | |
|---|---|---|---|---|
| 4,471,357 A | * | 9/1984 | Wu et al. | 342/25 |
| 5,063,524 A | * | 11/1991 | Ferre et al. | 382/107 |
| 5,394,151 A | | 2/1995 | Knaell et al. | 342/25 |
| 5,659,318 A | | 8/1997 | Madsen et al. | 342/25 |
| 5,945,937 A | * | 8/1999 | Fujimura | 342/25 |
| 5,959,566 A | * | 9/1999 | Petty | 342/25 |
| 6,298,144 B1 | * | 10/2001 | Pucker et al. | 382/103 |
| 6,307,951 B1 | * | 10/2001 | Tanigawa et al. | 382/103 |

OTHER PUBLICATIONS

Laura S. Rogers et al., SAR image Despeckling using the Multiscale Edge Representation, 1998 IEEE, pp. 10–12.*
Jongseob Baek et al., A Fast Array Architecture for Block Matching Algorithm, Circuits and Systems, 1994 IEEE International Symposium on , vol.: 4, Page(s): 211–214.*
Baringer, W.B., High speed high accuracy motion detection and tracking on the parallel pipelined projection engine, Multidimensional Signal Processing Workshop, 1989., Sixth, Sep. 6–8, 1989, p. 70.*

Author: Charles V. Jakowatz, Jr. et al Title: Spotlight–Mode Synthetic Aperture Radar: A Signal Processing Approach Date: 1996 pp.: 330–340.

Author: D.G. Corr Title: Coherent Change Detection for Urban Development Monitoring Date: 1997 pp.: 6/1–6/6.

Author: D.G. Corr et al Title: Coherent Change Detection Of Vehicle Movements Date: 1998 pp.: 2451–2453.

Author: Edmund G. Zelnio et al Title: Algorithms For Synthetic Aperture Radar Imagery III Date: Apr. 1996 pp.: 59–69.

* cited by examiner

Primary Examiner—Thomas H. Tarcza
Assistant Examiner—Isam Alsomiri
(74) Attorney, Agent, or Firm—Lowell W. Gresham; Jordan M. Meschkow; Meschkow & Gresham, PLC

(57) ABSTRACT

A method (100) for coherent change subtraction of mission and reference synthetic aperture radar (SAR) data (20',20") is provided. The method (100) forms (102) mission and reference images (22',22") from the mission and reference SAR data (20',20"), registers (122) the mission and reference images (22',22") on a common plane to form registered mission and reference images (24',24"), and forms (124) the registered mission and reference images (24',24") into at least one patch (26) containing mission and reference data (28',28"). The method (100) then processes (126) each patch (26) by removing (130) linear phase terms (34) from the mission data (28'), trimming (142) non-overlapping spectra of the mission and reference data (28',28"), and balancing (144) phases and amplitudes of the mission data (28'). The method (100) then concatenates (160) the patches (26) to produce processed mission and reference images (52',52"), and subtracts (162) the processed mission and reference images (52',52") to form a delta image (54). The method (100) then postprocesses (164,170) the delta image (54) for specific applications.

25 Claims, 6 Drawing Sheets

CHANGE SUBTRACTION OF SYNTHETIC APERTURE RADAR DATA

TECHNICAL FIELD OF THE INVENTION

The present invention relates to the field of synthetic aperture radar image processing. More specifically, the present invention relates to the field of coherent change subtraction of mission and reference synthetic aperture radar data.

BACKGROUND OF THE INVENTION

Synthetic aperture radar (SAR) data is often subjected to analysis by backscatter amplitude or phase change detection, e.g., for the detection of a moving target. Similarly, SAR data is often subjected to analysis by combined noise and backscatter energy suppression, e.g., for low clutter-to-noise applications. Conventional techniques for analysis of SAR data include interferometric change detection, displaced phase center moving-target identification (MTI), and space-time adaptive processing (STAP).

Interferometric change detection identifies change when the detector output is small. The detector is a small local correlation window typically ranging in size from 3×3 pixels to 15×15 pixels. To maximize correlation, the phase history aperture in both range and azimuth is trimmed for some common ground plane. Spatially variant registration is required to correct for changes in the layover due to different geometries. Detection occurs when the correlation is low.

Problems exist with interferometric change detection. Interferometric change detection is a biased estimator and also decreases dynamic range. This results in a decrease in overall sensitivity. The ability of interferometric change detection to detect small changes is therefore limited. In addition, interferometric change detection is prone to false alarms from specular scatterers, and has decreased reliability with time varying waveforms.

Displaced phase center MTI uses coherent subtraction to suppress the ground clutter return. Moving targets, which are not suppressed by this process and can be detected by a conventional constant false alarm rate (CFAR) detection routine.

Problems exist with displaced phase center MTI. Displaced phase center MTI does not use full azimuth resolution. Also, displaced phase center MTI does not trim away non-correlating energy. These features result in decreased overall sensitivity. In addition, displaced phase center MTI has decreased reliability with time varying waveforms.

STAP is a locally adaptive technique that minimizes total competing energy. Moving targets, which are not suppressed by this process, can now be detected. STAP provides good performance for suppression of specular scatterers and jammers. Suppression of energy from diffuse scatterers is not as good.

Problems exist with STAP. STAP uses null casting and fails to compensate for all sources of distortion. This limits clutter suppression.

SUMMARY OF THE INVENTION

Accordingly, it is an advantage of the present invention that a method for coherent change subtraction of synthetic aperture radar (SAR) data is provided.

It is another advantage of the present invention that dynamic range is increased.

It is another advantage of the present invention that detection of small changes is enhanced.

It is another advantage of the present invention that false alarms from specular scatterers are suppressed.

It is another advantage of the present invention that the method works well with time varying waveforms.

It is another advantage of the present invention that non-correlating energy is trimmed off.

The above and other advantages of the present invention are carried out in one form by a method for coherent change subtraction of mission and reference SAR data. Complex images are formed of both the mission and reference SAR data. The complex images are integrated to form an integrated complex image. The integrated complex image is divided into at least one patch containing mission-image and reference-image data, where the mission-image data is data from the mission complex image and the reference-image data is data from the reference complex image. An interferogram is formed of each patch. A composite interferogram is produced. The mission complex image is subtracted from the reference complex image to form a delta complex image. The delta complex image is then postprocessed.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
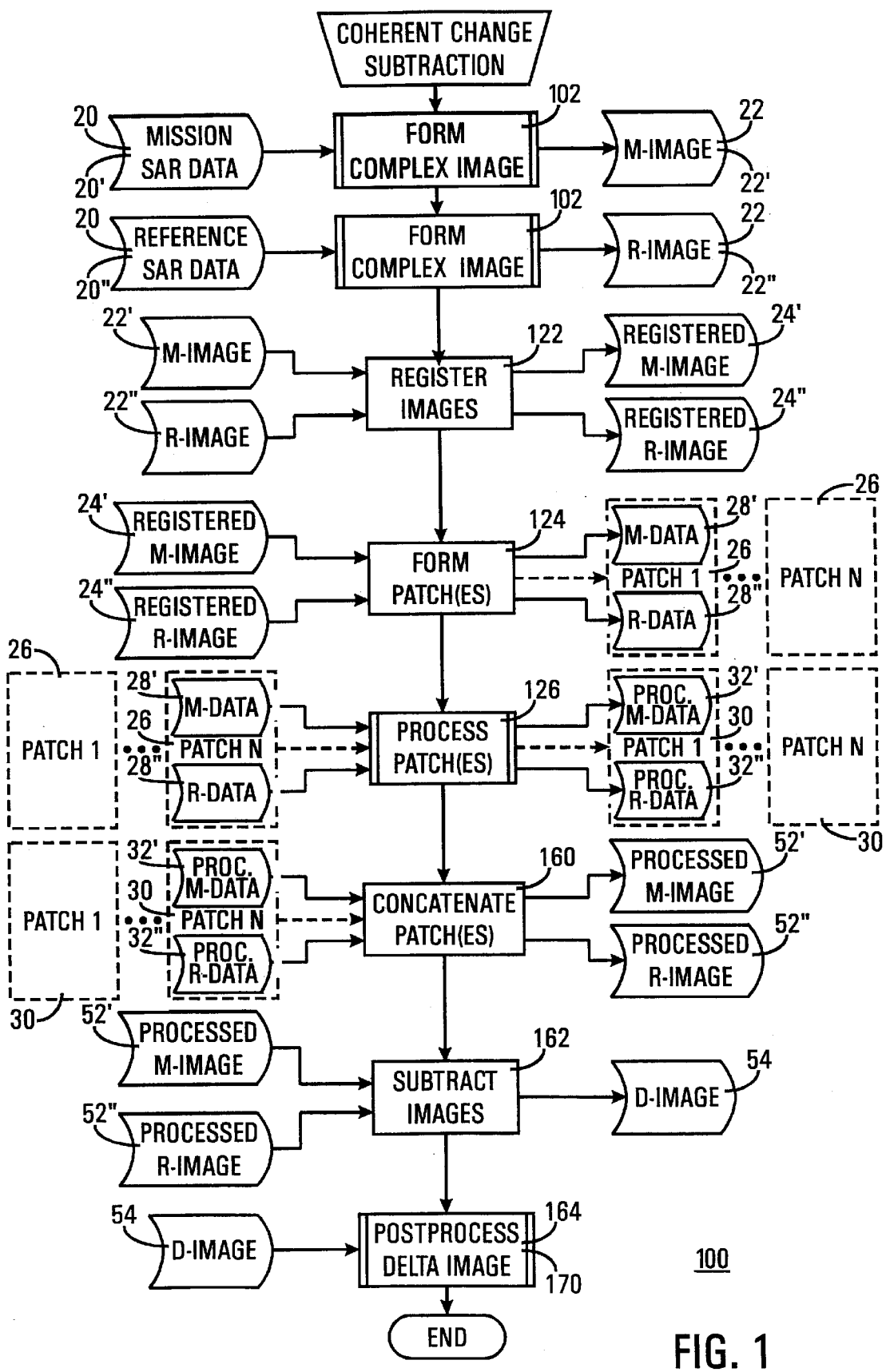
FIG. 1 depicts a flowchart of a coherent change subtraction process in accordance with a preferred embodiment of the present invention.

FIG. 1 depicts a flowchart of a coherent change subtraction process 100 in accordance with a preferred embodiment of the present invention. The following discussion refers to FIG. 1 and process 100.

In the preferred embodiment, process 100 is realized by a computer program. The language, code, and platform of the computer program are irrelevant to the present invention. Those skilled in the art will appreciate that the program may be written in any desired language, utilize any of a wide variety of coding conventions, and run upon any desired platform without departing from the spirit of the present invention.

Executing process 100 performs a coherent change subtraction of mission synthetic aperture radar (SAR) data 20' and reference SAR data 20". Process 100 may be executed for at least two purposes: for backscatter amplitude or phase detection (e.g., a moving-target detection application); and/or for combined noise and backscatter suppression (e.g., a low clutter-to-noise application). A coherent change difference between SAR data 20 of a specific target obtained in a given mission (i.e., mission SAR data 20') and SAR data 20 of that same target obtained in a previous mission (i.e., reference SAR data 20") is determined. Those skilled in the art will appreciate that the method used to obtain either mission SAR data 20' or reference SAR data 20" is irrelevant to the present invention.

In a first subprocess 102, a segment of the computer program forms an image 22 (i.e., a mission image [M-IMAGE] 22') in response to SAR data 20 (i.e., mission SAR data 20'). Subprocess 102 is formed of a plurality of tasks, each of which is preferably realized by a routine of the computer program segment.

Figure 2:
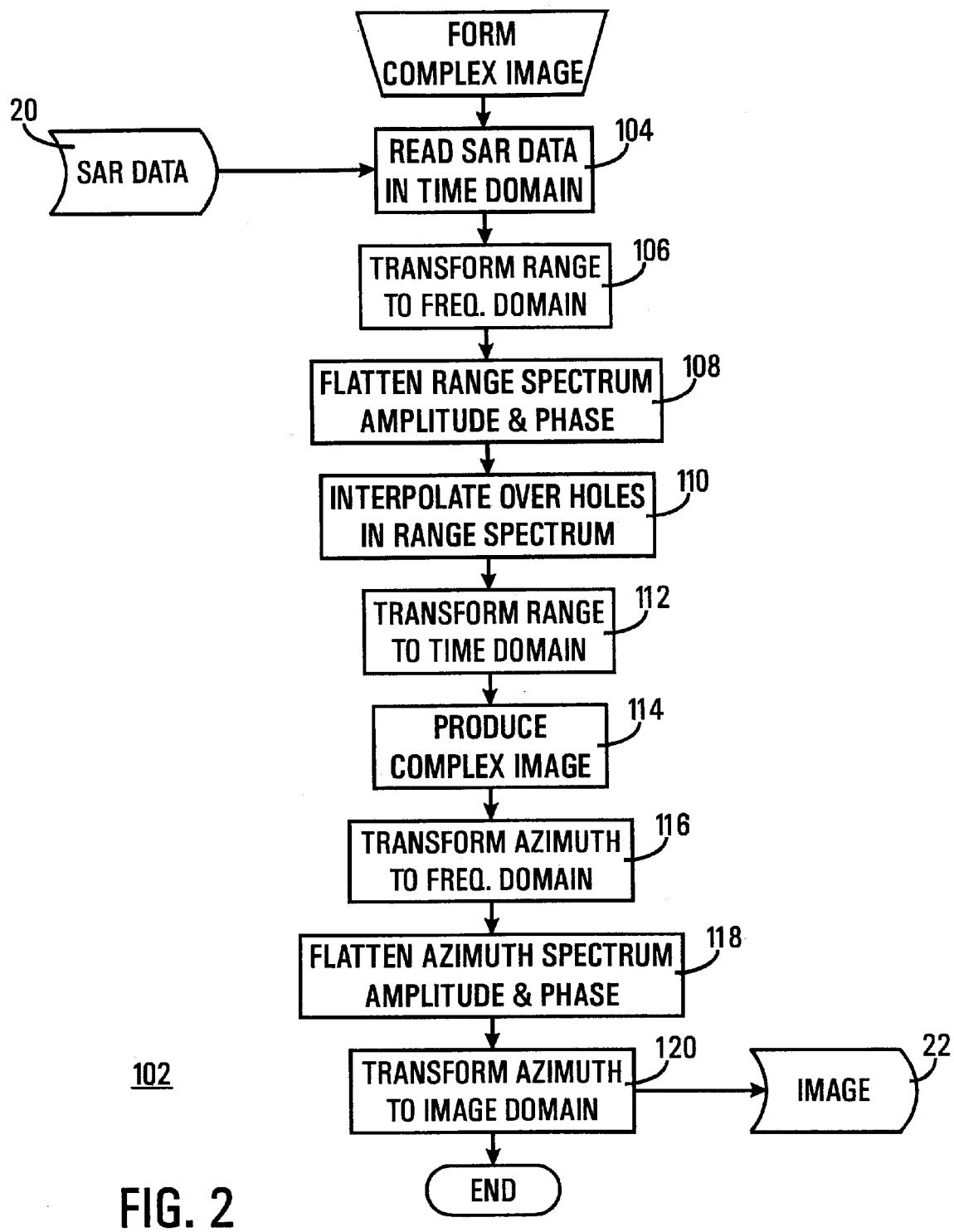
FIG. 2 depicts a flowchart of a subprocess to form a complex image in accordance with a preferred embodiment of the present invention.

FIG. 2 depicts a flowchart of subprocess 102 to form a complex image 22 in accordance with a preferred embodiment of the present invention. The following discussion refers to FIG. 2 and subprocess 102.

In an initial task 104, a computer routine reads SAR data 20 in a time domain. SAR data 20 is a two-dimensional data array. This array has a multiplicity of samples spaced in time in both a range direction (e.g., substantially perpendicular to a flight path of a sampling aircraft) and an azimuth direction (e.g., along the flight path of the sampling aircraft). SAR data 20 therefore resides in the time domain. Task 104 reads SAR data 20 into the computer without transforming SAR data 20 out of the time domain in which it resides.

In a task 106 following task 104, a computer routine then transforms range data of SAR data 20 from the time domain into a frequency domain. That is, range data for each azimuth sampling interval is transformed into the frequency domain. The transformed range data then exists as a range spectrum.

In the preferred embodiment, task 106 is desirably effected via a conventional one-dimensional fast Fourier transform routine. Those skilled in the art will appreciate that other transform routines may be used without departing from the spirit of the present invention.

In a task 108 following task 106, a computer routine then flattens the range spectrum of SAR data 20. That is, any amplitude and phase ripple or tilt in the range spectrum is reduced or removed.

In a task 110 following task 108, a computer routine interpolates over any holes in the range spectrum of SAR data 20. This is done to prevent the generation of false targets by process 100.

In the preferred embodiment, task 110 is desirably effected by a conventional constrained iteration routine. Those skilled in the art will appreciate that other interpolation routines may be used without departing from the spirit of the present invention.

In a task 112 following task 110, a computer routine then transforms range data of SAR data 20 from the frequency domain back into the time domain.

In the preferred embodiment, task 112 is desirably effected via a conventional one-dimensional inverse fast Fourier transform routine. Those skilled in the art will appreciate that other transform routines may be used without departing from the spirit of the present invention.

In a task 114 following task 112, a computer routine produces a complex image 22 in response to SAR data 20. SAR data 20, as captured by the sampling aircraft, would produce Fresnel patterns, resulting in a high noise content. If projected, these Fresnel patterns would tend to obscure the field of SAR data 20 and any targets therein. Task 114 resolves these Fresnel patterns to points, thereby producing image 22 from SAR data 20. Image 22 has as many samples (i.e., data points) as the original SAR data 20. Since image 22 is a true image, i.e., may be displayed, image 22 resides in an image domain, and task 114 produces image 22 in the image domain from SAR data 20 in the time domain.

In the preferred embodiment, SAR data 20 may be collected as conventional strip-map data, as spotlight data, or as combinatorial data. If SAR data 20 is collected as conventional strip-map data, e.g., data having a substantially rectangular data field, then task 114 desirably uses a conventional convolutional or fast-convolutional imaging routine to form image 22. If SAR data 20 is collected as spotlight data, e.g., data having one or more polar data fields, then task 114 desirably uses a conventional polar imaging routine to form image 22. If SAR data 20 is collected as combinatorial data, e.g., data having a substantially rectangular data field with one or more polar zones, then task 114 desirably uses a conventional sliding-polar imaging routine to form image 22. Those skilled in the art will appreciate that the routine used to effect task 114 is not germane to the present invention, and a routine not discussed herein may be used without departing from the spirit of the present invention.

In a task 116 following task 114, a computer routine transforms azimuth data of image 22 from the image domain into the frequency domain. That is, azimuth data for each range sampling interval is transformed into the frequency domain. The transformed azimuth data then exists as an azimuth spectrum.

In the preferred embodiment, task 116 is desirably effected via a conventional one-dimensional fast Fourier transform routine. Those skilled in the art will appreciate that other transform routines may be used without departing from the spirit of the present invention.

In a task 118 following task 116, a computer routine then flattens the azimuth spectrum of image 22. That is, any amplitude and phase ripple or tilt in the azimuth spectrum is reduced or removed.

In a task 120 following task 118, a computer routine then transforms azimuth data of image 22 from the frequency domain back into the image domain.

In the preferred embodiment, task 120 is desirably effected via a conventional one-dimensional inverse fast Fourier transform routine. Those skilled in the art will appreciate that other transform routines may be used without departing from the spirit of the present invention.

The following discussion refers to FIG. 1 and process 100.

The first subprocess 102 has been completed. Image 22 (i.e., mission image 22') has been formed in response to SAR data 20 (i.e., mission SAR data 20').

In a substantially identical second subprocess 102, a segment of the computer program forms another image 22 (i.e., a reference image [R-IMAGE] 22") in response to other SAR data 20 (i.e., reference SAR data 20"). This is effected in the manner discussed hereinbefore in connection with the first subprocess 102, mission SAR data 20', and mission image 22'.

First subroutine 102 forms mission image 22' from mission SAR data 20' so that mission image 22' bears a predetermined relationship to mission SAR data 20'. Being substantially identical, second subroutine 102 forms reference image 22" from reference SAR data 20" so that reference image 22" bears substantially the same predetermined relationship to reference SAR data 20".

Those skilled in the art will appreciate that by producing both mission and reference images 22' and 22" in which the range and azimuth spectra have been flattened, the dynamic range of process 100 is significantly increased. It will also be appreciated that the order in which first and second subprocesses 102 are effected is irrelevant to the present invention.

In a task 122 following first and second subprocesses 102, a segment of the computer program registers each of mission image 22' and reference image 22" on a common plane (not shown) to produce a registered mission image (REGISTERED M-IMAGE) 24' and a registered reference image (REGISTERED M-IMAGE) 24". In task 122, a first computer routine projects mission image 22' to the common plane, and a second computer routine projects reference image 22" to the common plane. A third computer routine then registers mission and reference images 22' and 22" on the common plane.

In the preferred embodiment, the common plane is desirably a substantially horizontal plane at some arbitrary "ground" level. The projection routines then effectively reorient mission and reference images 22' and 22" so that images 22' and 22", if displayed, would appear as aerial "maps" viewed from a target zenith. Mission and reference images 22' and 22" are then projected mission and reference images (not shown).

In the third routine of task 122, the projected mission and reference images are registered, i.e., made coincident with each other, on the common plane. This registration may involve any combination of translation, rotation, and/or scaling of the images. This registration results in registered mission and reference images 24' and 24".

Those skilled in the art will appreciate that the selection of a given plane for the common plane is arbitrary and is not a part of the present invention. The use of other than a substantially horizontal ground plane as the common plane does not depart from the spirit of the present invention.

Those skilled in the art will also appreciate that conventional geometric projection, translation, rotation, and scaling routines are desirably used to effect task 122. The use of any given routine is not a requirement of and does not depart from the spirit of the present invention.

In the preferred embodiment, registered mission and reference images 24' and 24" are desirably registered in task 122 to better than one-half pixel, preferably to within one-quarter pixel. That is, each pixel of registered mission image 24' is within one-quarter pixel of the location of a coincident pixel of registered reference image 24". Coincident pixels of registered images 24' and 24" are those pixels having substantially coincident locations, i.e., substantially the same locations relative to the target.

In a task 124 following task 122, a segment of the computer program forms "N" patches 26 of registered mission and reference images 24' and 24", where "N" is an integer of at least one. If the imaged terrain has a nominally constant slope, then "N" may be one. If the terrain slope varies significantly over the image area, then "N" would be greater than one.

If "N" is one, then in task 124, a computer routine then divides registered mission and reference images 24' and 24" into one patch 26 substantially equal to the whole of registered mission and reference images 24' and 24".

The one patch 26 formed by task 124 contains mission data (M-DATA) 28' and reference data (R-DATA) 28". Since the one patch 26 contains substantially the whole of registered mission and reference images 24' and 24", mission data 28' is substantially equal to the whole of registered mission image 24' and reference data 28" is substantially equal to the whole of registered reference image 24".

If "N" is an integer greater than one, then in task 124, a computer routine divides registered mission and reference images 24' and 24" into "N" patches 26. Each patch 26 is substantially equal to separate substantially coincident portions of registered mission and reference images 24' and 24". Coincident portions of registered images 24' and 24" are those portions having substantially coincident locations, i.e., substantially the same locations relative to the target. The total number of patches 26 determines, in some part, the final resolution obtained by process 100. That is, the greater the number of patches 26, the greater the final resolution of process 100.

Each patch 26 formed by task 124 contains mission data 28' and reference data 28". Mission data 28' in a given patch 26 is substantially equal to that portion of registered mission image 24' contained in that given patch 26. Likewise, reference data 28" in the given patch 26 is substantially equal to that portion of registered reference image 24" contained in that given patch 26.

In a subprocess 126, each patch 26 formed by task 124 and containing mission data 28' and reference data 28" is processed to become a processed patch 30 containing process mission data (PROC. M-DATA) 32' and processed reference data (PROC. R-DATA) 32". Since subprocess 126 processes one patch 26, those skilled in the art will understand that subprocess 126 is effected "N" times, once for each of the "N" patches 26 formed by task 124. The following discussion of subprocess 126 therefore applies to each of the "N" patches 26.

Figure 3:
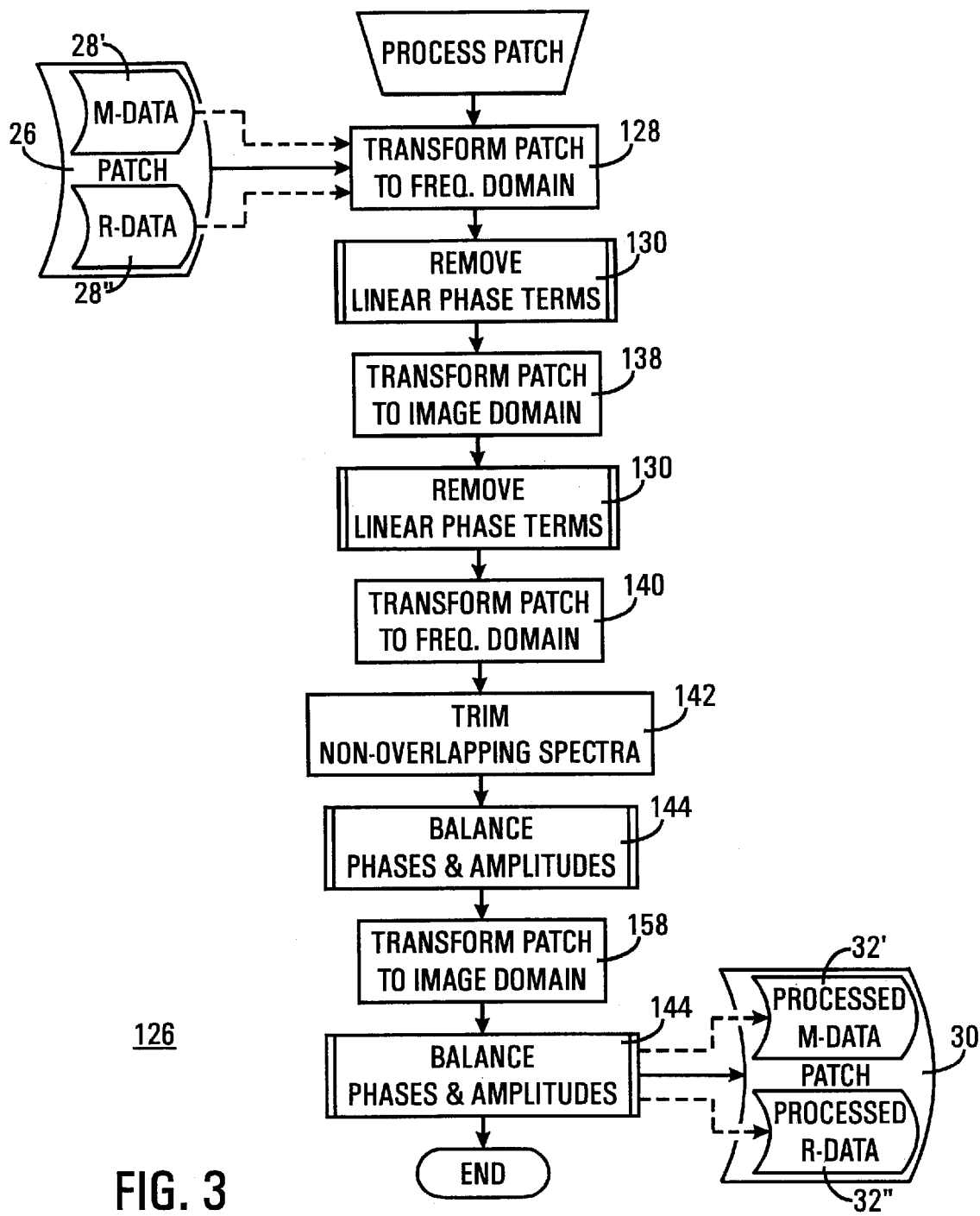
FIG. 3 depicts a flowchart of a subprocess to process a patch in accordance with a preferred embodiment of the present invention.

FIG. 3 depicts a flowchart of subprocess 126 to process a single patch 26 in accordance with a preferred embodiment of the present invention. The following discussion refers to FIG. 3 and subprocess 126.

In an initial task 128, a computer routine transforms patch 26 from the image domain to the frequency domain.

In the preferred embodiment, task 128 is desirably effected via a conventional two-dimensional fast Fourier transform routine. Those skilled in the art will appreciate that other transform routines may be used without departing from the spirit of the present invention.

In a first subprocess 130 following task 128 of subprocess 126, a computer routine removes linear phase terms 34 from at least mission data 28' in patch 26 in the frequency domain.

Figure 4:
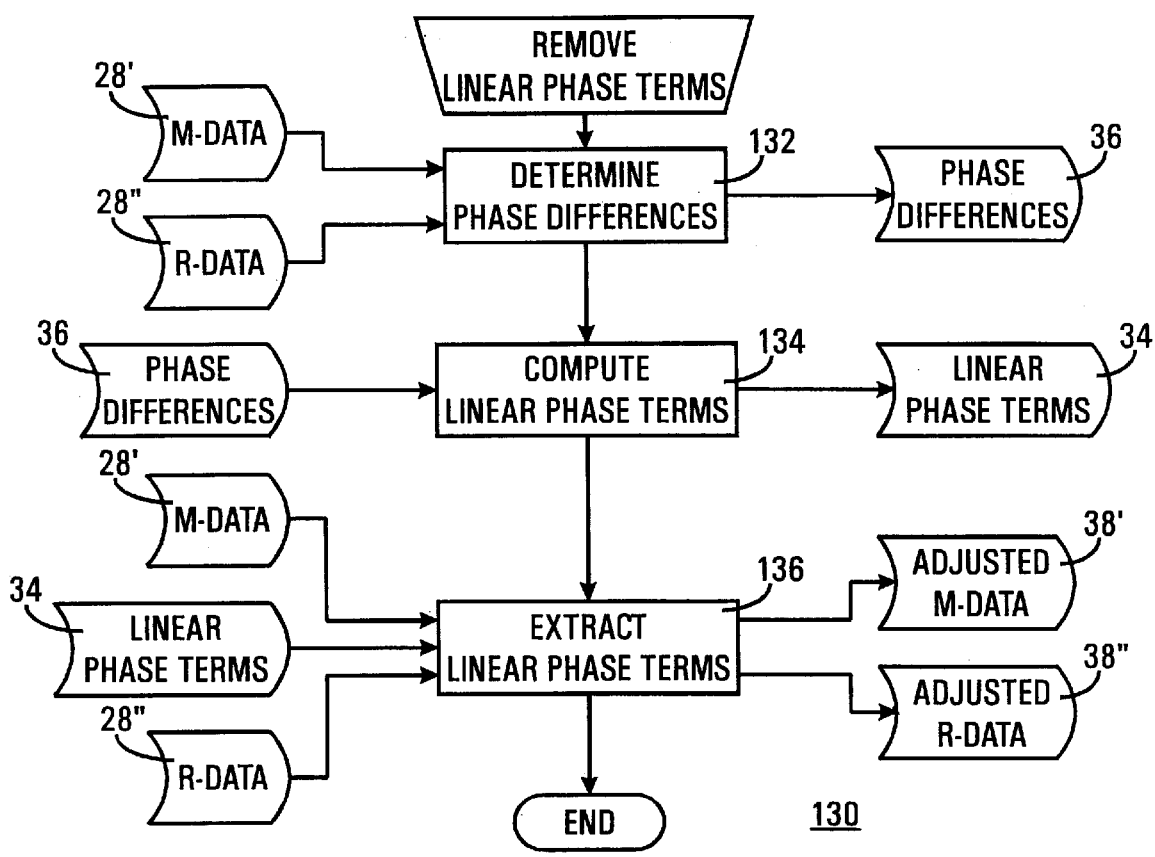
FIG. 4 depicts a flowchart of a subprocess to remove linear phase terms in accordance with a preferred embodiment of the present invention.

FIG. 4 depicts a flowchart of subprocess 130 to remove linear phase terms 34 from mission data 28' in accordance with a preferred embodiment of the present invention. The following discussion refers to FIG. 4 and subprocess 130.

In an initial task 132, a computer routine determines phase differences 36 between phases of mission data 28' and phases of reference data 28". Phase differences 36 represents arbitrary functions (not shown). These arbitrary functions are typically non-linear.

In the preferred embodiment, task 132 is desirably effected by subtracting reference data 28" from mission data 28'. Those skilled in the art will appreciate that task 132 desirably includes any necessary unwrapping of the phases of mission and/or reference data 28' and/or 28".

In a task 134 following task 132, a computer routine computes linear phase terms 34 of phase differences 36.

In the preferred embodiment, task 134 realizes linear phase terms 34 as best-fit linear functions of the arbitrary functions of phase differences 36.

In a task 136 following task 134, a computer routine then extracts linear phase terms 34 from at least mission data 28'.

In the preferred embodiments, linear phase terms 34 are extracted by subtraction. In one preferred embodiment, task 136 desirably subtracts substantially all of linear phase terms 34 from phases of mission data 28'. In another preferred embodiment, task 136 subtracts substantially half of linear phase terms 34 from mission data 28' and substantially half of linear phase terms 34 from reference data 28". Those skilled in the art will appreciate that linear phase terms 34 may be extracted from mission and/or reference data 28' and/or 28" in other manners without departing from the spirit of the present invention.

Subprocess 130 is now complete and linear phase terms 34 have been extracted from mission data 28' or from mission and reference data 28' and 28" to produce adjusted mission and reference data 38' and 38". Adjusted mission and reference data 38' and 38" represent the outputs of subprocess 130. Because of multiple subprocesses 130 within subprocess 126, adjusted mission data 38' and reference data 38" shall continue to be referred to as simply mission data (M-DATA) 28' and reference data (R-DATA) 28" at all locations within subprocess 126 until subprocess 126 has been completed.

The following discussion refers to FIG. 3 and subprocess 126.

In a task 138 following first subprocess 130, a computer routine transforms patch 26 from the frequency domain back to the image domain.

In the preferred embodiment, task 138 is desirably effected via a conventional two-dimensional inverse fast Fourier transform routine. Those skilled in the art will appreciate that other transform routines may be used without departing from the spirit of the present invention.

In a second subprocess 130 following task 138, a computer routine removes linear phase terms 34 from at least mission data 28' in patch 26 in the image domain. Second subprocess 130 is effected substantially identically to first subprocess 130 discussed hereinbefore.

By removing linear phase terms 34 from mission data 28' in both the frequency domain and the time domain, mission data 28' is trimmed of spurious phase shifts and other related phenomena. This in effect increases the signal to noise ratio of mission data 28' and enhances the detection of small changes between mission data 28' and reference data 28" by process 100.

In a task 140 following second subprocess 130, a computer routine transforms patch 26 from the image domain to the frequency domain.

In the preferred embodiment, task 140 is desirably effected via a conventional two-dimensional fast Fourier transform routine. Those skilled in the art will appreciate that other transform routines may be used without departing from the spirit of the present invention.

In a task 142 following task 140, a computer routine then trims off or otherwise discards portions of the spectra of mission data 28' that do not overlap coincident portions of the spectra of reference data 28. Similarly, the computer routine trims off or otherwise discards portions of the spectra of reference data 28" that do not overlap coincident portions of the spectra of mission data 28'. Through these actions, mission data 28' and reference data 28" are made substantially coincident in patch 26 in the frequency domain.

By trimming non-overlapping spectra of both mission and reference data 28' and 28", task 142 trims off non-correlating data from images 24' and 24", thereby improving the overall accuracy of process 100.

In a first subprocess 144 following task 142, a computer routine balances the phases and amplitudes of mission data 28' in patch 26 in the frequency domain.

Figure 5:
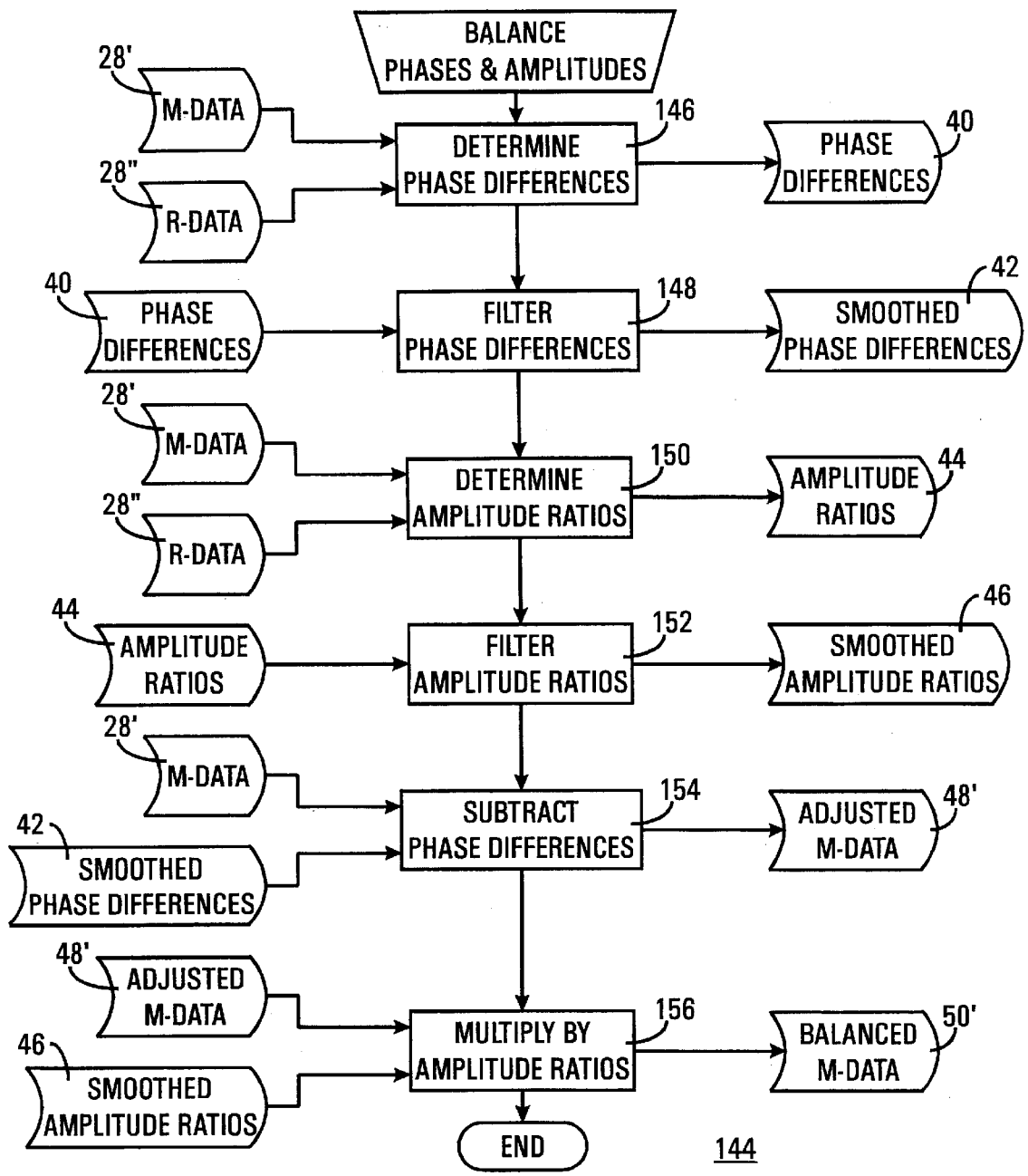
FIG. 5 depicts a flowchart of a subprocess to balance phases and amplitudes in accordance with a preferred embodiment of the present invention.

FIG. 5 depicts a flowchart of subprocess 144 to balance phases and amplitudes of mission data 28' in accordance with a preferred embodiment of the present invention. The following discussion refers to FIG. 5 and subprocess 144.

In an initial task 146, a computer routine determines phase differences 40 between phases of mission data 28' and phases of reference data 28".

In the preferred embodiment, task 146 is desirably effected by subtracting the phases of reference data 28" from the coincident phases of mission data 28'. Those skilled in the art will appreciate that task 146 desirably includes any necessary unwrapping of the phases of mission and/or reference data 28' and/or 28".

In a task 148 following task 146, a computer routine then filters phase differences 40 to produce filtered or smoothed phase differences 42.

In the preferred embodiment, task 148 is desirably effected by a conventional two-dimensional smoothing filter routine. Those skilled in the art will appreciate that other filtering, averaging, and/or otherwise smoothing routines may be used without departing from the spirit of the present invention.

In a task 150 following task 148, a computer routine determines amplitude ratios 44 between amplitudes of mission data 28' and amplitudes of reference data 28".

In the preferred embodiment, task 150 is desirably effected by dividing the amplitudes of mission data 28' by the coincident amplitudes of reference data 28".

In a task 152 following task 150, a computer routine then filters amplitude ratios 44 to produce filtered or smoothed phase differences 46.

In the preferred embodiment, task 152 is desirably effected by a conventional two-dimensional smoothing filter routine.

Those skilled in the art will appreciate that other filtering, averaging, and/or smoothing routines may be used without departing from the spirit of the present invention.

In a task 154 following task 152, a computer routine then subtracts filtered phase differences 42 from coincident phases of mission data 28' to produce adjusted mission data (ADJUSTED M-DATA) 48'.

In a task 156 following task 154, a computer routine then multiplies amplitudes of adjusted mission data 48' by coincident filtered amplitude ratios 46 to produce balanced mission data (BALANCED M-DATA) 50'.

Subprocess 144 is now complete and phases and amplitudes of mission data 28' have been balanced to produce balanced mission data 50'. Balanced mission data 50' represent the outputs of subprocess 144. Because of multiple subprocesses 144 within subprocess 126, balance mission data 50' shall continue to be referred to as simply mission data (M-DATA) 28' at all locations within subprocess 126 until subprocess 126 has been completed.

The following discussion refers to FIG. 3 and subprocess 126.

In a task 158 following first subprocess 144, a computer routine transforms patch 26 from the frequency domain back to the image domain.

In the preferred embodiment, task 158 is desirably effected via a conventional two-dimensional inverse fast Fourier transform routine. Those skilled in the art will appreciate that other transform routines may be used without departing from the spirit of the present invention.

In a second subprocess 144 following task 158, a computer routine balances phases and amplitudes of mission data 28' in patch 26 in the image domain. Second subprocess 144 is effected substantially identically to first subprocess 144 discussed hereinbefore. After second subprocess 144, subroutine 126 has processed mission and reference data 28' and 28" into processed mission and reference data 32' and 32".

By balancing mission data 28' in both the frequency domain and the time domain, first and second subprocesses 144 allow process 100 to avoid biased estimation and suppress false alarms from specular scatterers. This allows process 100 to work well with time-varying waveforms.

Subprocess 126 is now complete and patch 26, containing mission data (M-DATA) 28' and reference data (R-DATA) 28", has been processed to produce processed patch 30 containing processed mission data (PROC. M-DATA) 32' and processed reference data (PROC. R-DATA) 32". Those skilled in the art will appreciate that subprocess 126 is repeated for each of the "N" patches formed by task 124 as discussed hereinbefore.

The following discussion refers to FIG. 1 and process 100.

In a task 160 following subprocess 126, a segment of the computer program concatenates processed patches 30, each containing processed mission data 32' and processed reference data 32", to produce processed mission image 52' and processed reference image 52".

If process 100 is effected for backscatter amplitude or phase detection, then task 124 divided registered mission and reference images 24' and 24" into "N" patches where N=1. The one patch 26 is substantially equal to the whole of registered mission and reference images 24' and 24". In this case, processed mission data 32' is processed mission image 52' and processed reference data 32" is processed reference image 52". Task 160 effectively does nothing, i.e., the concatenation of one processed patch 30 is a null operation.

If process 100 is effected for combined noise and backscatter suppression, then task 124 divided registered mission and reference images 24' and 24" into "N" patches 26 where N>1. In this case, task 160 concatenates each processed patch 30, containing that portion of processed mission and reference data 32' and 32" peculiar to that processed patch 30, into a single concatenated patch (not shown) containing concatenated mission and reference data (not shown). The concatenated mission data is processed mission image (PROCESSED M-IMAGE) 52' and the concatenated reference data is processed reference image (PROCESSED R-IMAGE) 52".

In a task 162 following task 160, a segment of the computer program subtracts either processed reference image 52" from processed mission image 52', or processed mission image 52' from processed reference image 52" to form a delta image (D-IMAGE) 54. Delta image 54 is therefore the difference between processed mission and reference images 52' and 52".

In the preferred embodiment, delta image 54 is made equal to the difference between processed mission and reference images 52' and 52". Those skilled in the art will appreciate that the method of deriving delta image 54 is irrelevant to the present invention. Other methods may be used without departing from the spirit of the present invention.

Process 100 has now effected coherent change subtraction of the original mission and reference SAR data 20' and 20".

Since non-overlapping spectra of mission and reference data 28' and 28" were trimmed in task 142 of subprocess 126 (FIG. 3), the resultant processed mission and reference images 32' and 32" have substantially a like number of pixels. Therefore, delta image 54 also has substantially the like number of pixels.

In a subprocess 164, a segment of the computer program postprocesses delta image 54 for backscatter amplitude or phase detection. Conversely, in a subprocess 170, a segment of the computer program postprocesses delta image 54 for combined noise and backscatter suppression.

Figure 6:
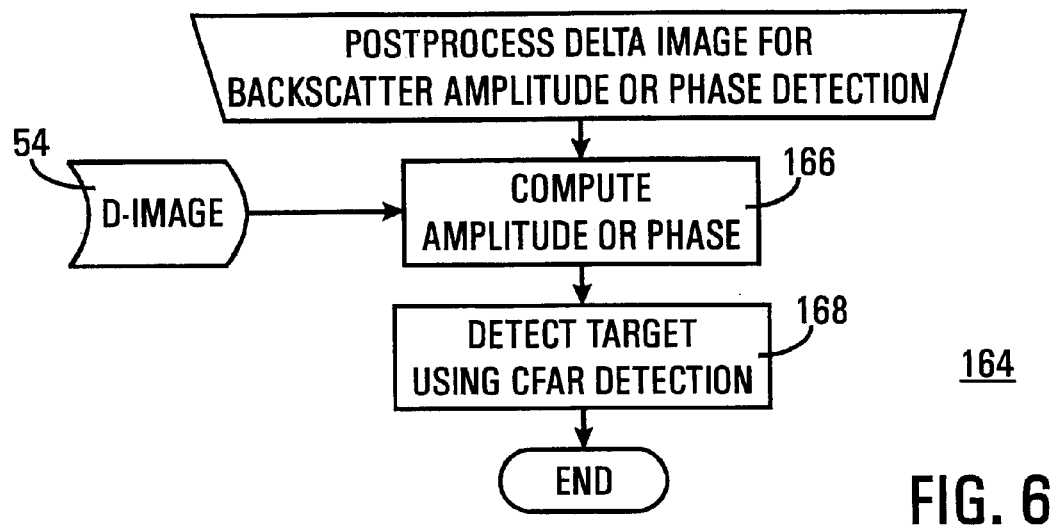
FIG. 6 depicts a flowchart of a subprocess to postprocess a delta image for backscatter amplitude or phase detection in accordance with a preferred embodiment of the present invention.

FIG. 6 depicts a flowchart of subprocess 164 to postprocess delta image 54 for backscatter amplitude or phase detection in accordance with a preferred embodiment of the present invention. The following discussion refers to FIG. 6 and subprocess 164.

In an initial task 166, a computer routine computes either amplitude or phase changes of delta complex image 54. Tasks 162 and 166 may compute the ratio between the amplitudes of processed mission image 52' and processed reference image 52". To balance the amplitude, an amplitude multiplier is derived by filtering the amplitude ratio.

Alternatively, tasks 162 and 166 may compute the difference between the phases of processed mission image 52' and processed reference image 52". To balance the phase, a phase adder is derived by filtering the phase difference. The selection of which method is used by tasks 162 and 166 is a trade of sensitivity versus false alarm rate.

In a task 168 following task 166, a computer routine then detects a target (e.g., a moving target) in delta image 54 in response to the amplitude or phase changes thereof.

In the preferred embodiment, tasks 166 and 168 are desirably effected by conventional constant false alarm rate (CFAR) detection routines. Those skilled in the art will appreciate, however, that other routines and detection methods may be used without departing from the spirit of the present invention.

Figure 7:
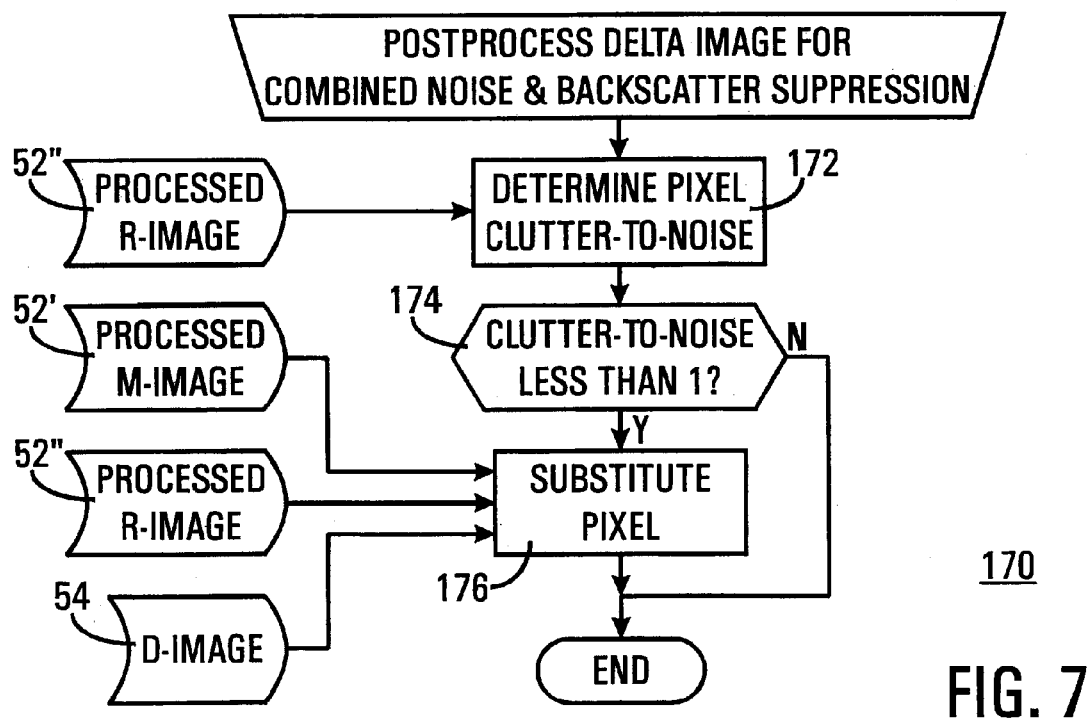
FIG. 7 depicts a flowchart of a subprocess to postprocess a delta image for combined noise and backscatter suppression in accordance with a preferred embodiment of the present invention.

FIG. 7 depicts a flowchart of a subprocess 170 to postprocess delta image 54 for combined noise and backscatter suppression in accordance with a preferred embodiment of the present invention. The following discussion refers to FIG. 7 and subprocess 170.

In an initial task 172, a computer routine determines the clutter-to-noise ratio (not shown) for each pixel (not shown) in turn of processed reference image 52".

For each given pixel of delta image 54, in a query task 174 following task 172, a decision routine ascertains if that given pixel has a clutter-to-noise ratio of less than one.

If, for that given pixel, query task 174 determines that the clutter-to-noise ratio is less than one, then in a task 176, a coincident pixel from one of processed mission image 52', processed reference image 52", or delta image 54 having the lowest amplitude ratio is substituted for that given pixel in delta image 54. This reduces to the lowest extent the clutter-to-noise ratios of all pixels of delta image 54, thereby effecting combined noise and backscatter suppression.

Those skilled in the art will appreciate that the use of process 100 for coherent change subtraction of the original mission and reference SAR data 20' and 20" for backscatter amplitude or phase detection or for combined noise and backscatter suppression, as discussed hereinbefore, is not a requirement of the present invention. The use of delta image 54 for applications other than, or in conjunction with, backscatter amplitude or phase detection and/or with combined noise and backscatter suppression, does not depart from the spirit of the present invention.

Those skilled in the art will also appreciate that the of tasks disclosed in the above discussion is exemplary only. As discussed, an important aspect of the present invention is the balancing of the phase and amplitude of the two images in both the time and frequency domains. It will be understood, however, that the order of the tasks taken to accomplish this may be varied. That is, either the time domain or the frequency domain data could be processed first, and either the phase or the amplitude balancing could be performed first, without departing from the spirit of the present invention.

In summary, the present invention teaches a method 100 for coherent change subtraction of synthetic aperture radar (SAR) data 20. Method 100 avoids biased estimation, increases dynamic range, enhances detection of small changes, suppresses false alarms from specular scatterers, trims off non-correlating energy, and works well with time varying waveforms.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method effects coherent change subtraction of mission synthetic aperture radar (SAR) data and reference SAR data for suppression of combined noise and backscatter energy, said method comprising:
   a) forming a mission image from said mission SAR data;
   b) forming a reference image from said reference SAR data;
   c) registering said mission and reference images to form registered mission and reference images;
   d) forming said registered mission and reference images into a plurality of patches of said registered mission and reference images, wherein each of said patches contains mission data, being data from said registered mission image, and reference data, being data from said registered reference image, and wherein each of said patches is substantially equal to a separate portion of said registered mission and reference images;
   e) processing said mission and reference data in each patch of said plurality of patches to produce processed mission and reference data;
   f) producing a processed mission image and a processed reference image by concatenating said processed mission and reference data from each of said plurality of patches;
   g) subtracting a first one of said processed mission and reference images from a second one of said processed mission and reference images to form a delta image, wherein said mission image, said reference image, and said delta image each have substantially a like number of pixels; and
   h) postprocessing said delta image, said postprocessing activity h) comprising:
   determining, for each pixel of said delta image, if said each pixel has a clutter-to-noise ratio of less than one; and
   substituting, when said determining activity determines said each pixel has a clutter-to-noise ratio of less than one, a replacement pixel for said each pixel, wherein said replacement pixel is a coincident pixel from one of said processed mission image, said processed reference image, and said delta image having a lowest amplitude ratio.

2. A method as claimed in claim 1 wherein:
   said forming activity a) forms said mission image from said mission SAR data so that said mission image bears a predetermined relationship to said mission SAR data; and
   said forming activity b) forms said reference image from said reference SAR data so that said reference image bears substantially said predetermined relationship to said reference SAR data.

3. A method as claimed in claim 1 wherein said forming activity a) comprises:
   flattening a range spectrum of said mission SAR data;
   producing said mission image in response to said mission SAR data;
   flattening an azimuth spectrum of said mission image.

4. A method as claimed in claim 3 wherein:
   said range spectrum contains holes; and
   said forming activity a) additionally comprises interpolating over said holes prior to said producing activity.

5. A method as claimed in claim 1 wherein said registering activity c) registers said mission and reference images to better than 0.5 pixel.

6. A method for coherent change subtraction of mission synthetic aperture radar (SAR) data and reference SAR data, said method comprising:
   forming a mission image from said mission SAR data;
   forming a reference image from said reference SAR data;
   registering said mission and reference images to form registered mission and reference images;
   forming at least one patch of said registered mission and reference images, wherein said at least one patch contains mission data, being data from said registered mission image, and reference data, being data from said registered reference image;
   processing said at least one patch, said processing activity e) comprising:
   a) removing linear phase terms from at least said mission data in said at least one patch in a frequency domain;
   b) removing linear phase terms from at least said mission data in said at least one patch in an image domain;
   c) trimming non-overlapping spectrum from said mission data and reference data in said at least one patch in said frequency domain;
   d) balancing phases and amplitudes of said mission data in said at least one patch in said frequency domain; and
   e) balancing phases and amplitudes of said mission data in said at least one patch in said image domain producing a processed mission image and a processed reference image from said mission data and said reference data, respectively;

subtracting a first one of said processed mission and reference images from a second one of said processed mission and reference images to form a delta image; and postprocessing said delta image.

7. A method as claimed in claim 6 wherein said method effects said coherent change subtraction for detection of a change in one of an amplitude and a phase of backscatter, and wherein:

said forming activity d) forms said registered mission and reference images into one patch substantially equal to the whole of said registered mission and reference image;

said processing activity e) process said mission and reference data in said one patch to produce processed mission and reference data;

said producing activity f) produces said processed mission and reference images from said processed mission and reference data;

said postprocessing activity h) comprises:
  computing one of an amplitude and a phase of said delta image; and
  detecting a target in said delta image in response to said one of said amplitude and said phase.

8. A method as claimed in claim 7 wherein said detecting activity detects said target using constant false alarm rate detection.

9. A method as claimed in claim 6 wherein each of said removing activities a) and b) comprises:
  determining phase differences between phases of said mission data and phases of said reference data;
  computing said linear phase terms of said phase differences; and
  extracting said linear phase terms from at least said mission data.

10. A method as claimed in claim 9 wherein said extracting activity extracts substantially all of said linear phase terms from said mission data.

11. A method as claimed in claim 9 wherein said extracting activity extracts substantially a first half of said linear phase terms from said mission data and a second half of said linear phase terms from said reference data.

12. A method as claimed in claim 6 wherein each of said balancing activities d and e comprises:
  determining phase differences between phases of said mission data and phases of said reference data;
  determining amplitude ratios between amplitudes of said mission data and amplitudes of said reference data;
  subtracting said phase differences from phases of said mission data; and
  multiplying amplitudes of said mission data by said amplitude ratios.

13. A method for coherent change subtraction of mission synthetic aperture radar (SAR) data and reference SAR data for detection of a change in one of an amplitude and a phase of backscatter, said method comprising:
  a) forming a mission image from said mission SAR data;
  b) forming a reference image from said reference SAR data;
  c) registering said mission and reference images on a common plane to produce registered mission and reference images;
  d) removing linear phase terms from at least said registered mission image in a frequency domain;
  e) removing linear phase terms from at least said registered mission image in an image domain;
  f) trimming non-overlapping spectra of said registered mission and reference images;
  g) balancing phases and amplitudes of said mission and reference images in said frequency domain;
  h) balancing phases and amplitudes of said mission and reference images in said image domain;
  i) subtracting a first one of said processed mission and reference images from a second one of said processed mission and reference images to form a delta image; and
  j) computing one of an amplitude and a phase of said delta image; and
  k) detecting, in response to said one of said amplitude and said phase of said delta image, a target in said delta image using constant false alarm rate detection.

14. A method as claimed in claim 13 wherein said forming activity a) comprises:
  reading said mission SAR data;
  flattening a range spectrum of said mission SAR data;
  producing said mission image in response to said mission SAR data; and
  flattening an azimuth spectrum of said mission image.

15. A method as claimed in claim 13 wherein said forming activity b) comprises:
  reading said reference SAR data;
  flattening a range spectrum of said reference SAR data;
  producing said reference image in response to said reference. SAR data; and
  flattening an azimuth spectrum of said reference image.

16. A method as claimed in claim 13 wherein each of said removing activities d) and e) comprises:
  determining phase differences between phases of said mission image and phases of said reference image;
  computing linear phase terms of said phase differences; and
  extracting said linear phase terms from at least said mission image.

17. A method as claimed in claim 13 wherein each of said balancing activities g) and h) comprises:
  determining phase difference between phases of said mission data and phases of said reference images;
  determining amplitude ratios between amplitudes of said mission image and amplitudes of said reference image;
  subtracting said phase differences from phases of said mission image; and
  multiplying amplitudes of said mission image by said amplitude ratios.

18. A method for coherent change subtraction of mission synthetic aperture radar (SAR) data and reference SAR data for suppression of combined noise and backscatter energy, said method comprising:
  a) forming a mission image from said mission SAR data;
  b) forming a reference image from said reference SAR data;
  c) registering said mission and reference images on a common plane to form registered mission and reference images;
  d) forming a plurality of patches containing mission data, being data from said registered mission image, and reference data, being data from said registered reference image, wherein each of said patches in said plurality of patches is substantially equal to separate substantially coincident portions of said registered mission and reference images;

e) removing linear phase terms from at least said mission data in each of said patches in each of a frequency domain and an image domain;

f) trimming non-overlapping spectra of said mission data and said reference data in each of said patches;

g) balancing phases and amplitudes of said mission and reference data in each of said patches in each of said frequency and image domains;

h) concatenating each of said patches to produce a processed mission image and a processed reference image from said mission data and said reference data, respectively;

i) subtracting a first one of said processed mission and reference images from a second one of said processed mission and reference images to form a delta image, wherein said processed mission image, said processed reference image, and said delta image each have substantially a like number of pixels;

j) determining, for each pixel of said processed reference image, if said each pixel has a clutter-to-noise ratio of less than one; and k) substituting, when said determining activity j) determines said each pixel has a clutter-to-noise ratio of less than one, a replacement pixel for said each pixel, wherein said replacement pixel is a coincident pixel from one of said processed mission image, said processed reference image, and said delta image having a lowest amplitude ratio.

19. A method as claimed in claim 18 wherein, in each of said frequency and image domains, said removing activity e) comprises:

determining phase differences between a phase of said mission data and a phase of said reference data;

computing said linear phase terms of said phase difference; and extracting said linear phase terms from at least said mission data.

20. A method as claimed in claim 19 wherein said extracting activity extracts a first portion of said linear phase terms from said mission data and a second portion of said linear phase terms from said reference data.

21. A method as claimed in claim 18 wherein, in each of said frequency and image domains, said balancing activity g) comprises:

determining phase differences between phases of said mission data and phases of said reference data;

filtering said phase differences to produce filtered phase differences;

determining amplitude ratios between amplitudes of said mission data and amplitudes of said reference data;

filtering said amplitude ratios to produce filtered amplitude ratios;

subtracting said filtered phase differences from phases of said mission data; and multiplying amplitudes of said mission data by said filtered amplitude ratios.

22. A computer program for coherent change subtraction of mission synthetic aperture radar (SAR) data and reference SAR data for one of detection of a change in one of an amplitude and a phase of backscatter and suppression of combined noise and backscatter energy, said program comprising:

a first program segment configured to produce a mission image from said mission SAR data;

a second program segment configured to produce a reference image from said reference SAR data;

a third program segment configured to register each of said mission and reference images on a common plane to produce registered mission and reference images;

a fourth program segment configured to form at least one patch containing mission data, being data from said mission image, and reference data, being data from said reference image, wherein:

when said program performs said coherent change subtraction for said detection of a change in one of an amplitude and a phase of backscatter, said fourth program segment forms one patch substantially equal to the whole of said mission and reference complex images; and when said program performs said coherent change subtraction for said suppression of combined noise and backscatter energy, said fourth program segment forms a plurality of patches, wherein each of said patches in said plurality of patches is substantially equal to separate substantially coincident portions of said registered mission and reference images;

a fifth program segment configured to process said at least one patch to produce at least one processed patch;

a sixth program segment configured to concatenate said at least one processed patch to produce processed mission and reference images;

a seventh program segment configured to subtract a first one of said processed mission and reference images from a second one of said processed mission and reference images to form a delta image, wherein said processed mission image, said processed complex image, and said delta image each have substantially a like number of pixels; and an eighth program segment wherein:

when said program performs said coherent change subtraction detection of a change in one of an amplitude and a phase of backscatter, said eighth program segment is configured to compute an amplitude of said delta complex image, and detect said moving target in said delta complex image in response to said amplitude; and when said program performs said coherent change subtraction for said suppression of combined noise and backscatter energy, said eighth program segment is configured to substitute, for each pixel of said delta complex image, when a coincident pixel of said processed reference image has a clutter-to-noise ratio of less than one, a replacement pixel, wherein said replacement pixel is a coincident pixel from one of said mission, reference, and delta complex images having a lowest amplitude ratio.

23. A computer program as claimed in claim 22 wherein said first program segment comprises:

a first routine configured to read said mission SAR data;

a second, routine configured to flatten a range spectrum of said mission SAR data;

a third routine configured to interpolate over holes in said range spectrum;

a fourth routine configured to produce said mission image in response to said mission SAR data; and a fifth routine configured to flatten an azimuth spectrum of said mission image.

24. A computer program as claimed in claim 22 wherein said second program segment comprises:

a first routine configured to read said reference SAR data;

a second routine configured to flatten a range spectrum of said reference SAR data;

a third routine configured to interpolate over holes in said range spectrum;

a fourth routine configured to produce said reference image in response to said reference SAR data; and a fifth routine configured to flatten an azimuth spectrum of said reference image.

25. A computer program as claimed in claim 22 wherein said fifth program segment comprises:

a first routine configured to remove linear phase terms from said mission data in said at least one patch in each of a frequency domain and an image domain;

a second routine configured to trim non-overlapping spectra from said mission data and said reference data in said at least one patch; and a third routine configured to balance phases and amplitudes of said mission data in said at least one patch in each of said frequency and image domains.

* * * * *

UNITED STATES PATENT AND TRADEMARK OFFICE
CERTIFICATE OF CORRECTION

PATENT NO. : 6,650,273 B1
DATED : November 18, 2003
INVENTOR(S) : Obenshain

It is certified that error appears in the above-identified patent and that said Letters Patent is hereby corrected as shown below:

Column 1,
Line 40, delete "A method effect" and insert -- A method effecting --.

Signed and Sealed this

Thirteenth Day of January, 2004

JON W. DUDAS
*Acting Director of the United States Patent and Trademark Office*